United States Patent [19]

Yanagi et al.

[11] Patent Number: 5,186,907
[45] Date of Patent: Feb. 16, 1993

[54] APPARATUS FOR TREATING ORGANIC WASTE GAS

[75] Inventors: Motonori Yanagi; Masaharu Hama; Takaaki Fukumoto; Miki Tsukaguchi, all of Itami, Japan

[73] Assignee: Mitsubishi Denki Kabushiki Kaisha, Tokyo, Japan

[21] Appl. No.: 149,155

[22] Filed: Jan. 27, 1988

[30] Foreign Application Priority Data

Mar. 30, 1987 [JP] Japan .................. 62-79122
May 15, 1987 [JP] Japan .................. 62-119203
Aug. 12, 1987 [JP] Japan .................. 62-199901

[51] Int. Cl.$^5$ .......................................... B01J 19/08
[52] U.S. Cl. ............................. 422/186.3; 422/186.07
[58] Field of Search .................... 204/157.15; 210/748, 210/760, 758; 261/111, DIG. 80; 422/24, 80, 186, 186.3

[56] References Cited

U.S. PATENT DOCUMENTS

| | | | |
|---|---|---|---|
| 3,522,000 | 7/1970 | Kinney | 261/111 |
| 3,599,398 | 8/1971 | Jaeger | 55/84 |
| 3,915,180 | 10/1975 | Jacobs | 134/58 D |
| 3,951,797 | 4/1976 | Seely | 210/748 |
| 4,012,321 | 3/1977 | Koubek | 210/748 |
| 4,179,616 | 12/1979 | Coviello | 422/186.3 |
| 4,247,379 | 1/1981 | Leach | 204/157.41 |
| 4,255,383 | 3/1981 | Schenck | 422/24 |
| 4,274,970 | 6/1981 | Beitzel | 210/748 |
| 4,289,594 | 9/1981 | Alpaugh | 210/748 |
| 4,409,188 | 10/1983 | Silberzahn | 422/303 |
| 4,508,040 | 4/1985 | Santén | 110/347 |
| 4,512,900 | 4/1985 | Macur | 210/748 |
| 4,655,933 | 4/1987 | Johnson | 210/721 |
| 4,767,543 | 8/1988 | Chornet | 210/759 |
| 4,786,812 | 11/1988 | Humphreys | 250/455.1 |

FOREIGN PATENT DOCUMENTS 55-15627 2/1980 Japan .
56-144725 11/1981 Japan .

OTHER PUBLICATIONS

Grant et al., Chemical Dictionary, 5th ed., p. 609 (1987).

Primary Examiner—W. Gary Jones
Assistant Examiner—Dean Nguyen
Attorney, Agent, or Firm—Leydig, Voit & Mayer

[57] ABSTRACT

An apparatus for treating an organic waste gas has an oxidizing means for contacting the waste gas with an oxidizing agent to effect primary oxidation and form a primary oxidation product. An ultraviolet wave generator inradiates the primary reaction product with UV light in the near UV range to effect secondary oxidation of the primary reaction product.

25 Claims, 5 Drawing Sheets

APPARATUS FOR TREATING ORGANIC WASTE GAS

BACKGROUND OF THE INVENTION

1. Field of the Invention

The present invention relates to a method and apparatus for treating an organic waste gas and, more particularly, to a method and apparatus for discharging an organic waste gas containing organic solvents etc. out of a system after a suitable oxidizing treatment.

2. Description of the Prior Art

Free discharge of waste gases containing noxious components such as organic solvents without any treatment such as oxidation causes air pollution. It has been, therefore, a common practice to effect a suitable treatment such as oxidation so as to render the gases harmless before such gases are discharged to the atmosphere.

Figure 5:
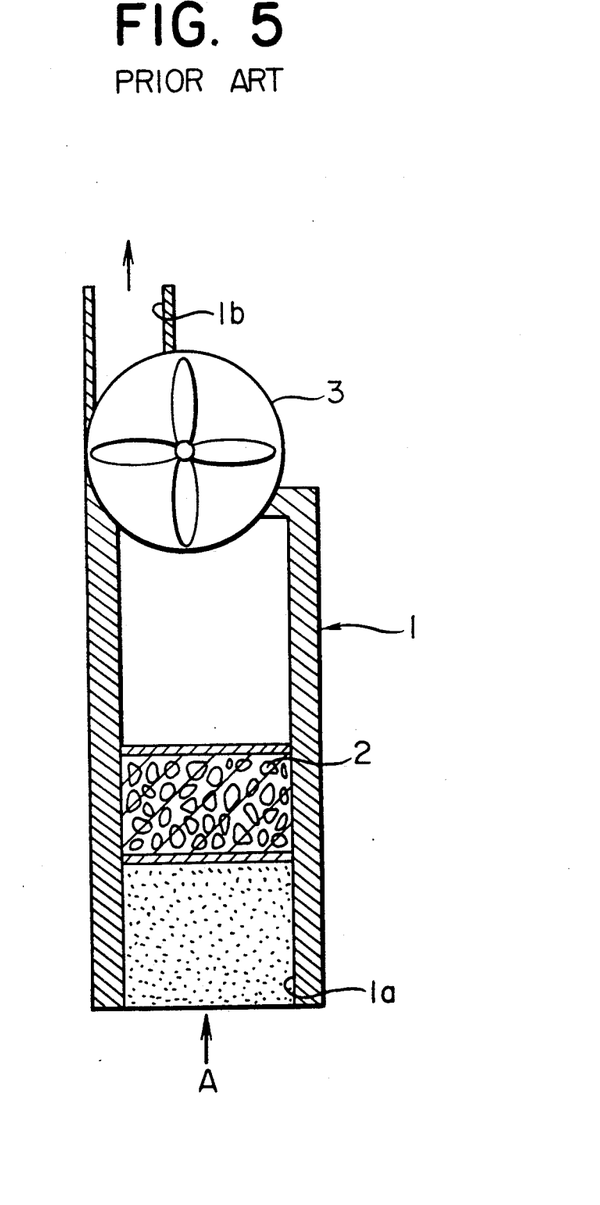
FIG. 5 is a vertical sectional view of a conventional organic waste gas treatment apparatus.

A typical example of an apparatus for treating organic waste gases, designed to effect a suitable treatment before the gases are released to the atmosphere, will be explained with specific reference to FIG. 5 which is a sectional view of the apparatus. The treatment apparatus has a cylindrical casing 1 provided at its one end with an inlet 1a and at its other end with an outlet 1b, an activated carbon filter 2 disposed in the casing 1 such as to divide the space in the casing into two sections and adapted to adsorb any organic solvent carried by the waste gas, and a fan mounted in the casing 1 near the outlet 1b and adapted to induce the waste gas from a source (not shown) of the gas past the inlet 1a and to discharge the treated gas through the outlet 1b.

In operation, as the fan 3 operates, the waste gas (referred to as "organic solvent waste gas" hereinafter) containing air and a mist of suspended organic solvents such as methanol or trichlene is sucked from the source into the casing 1 through the inlet 1a as indicated by an arrow A. The organic solvent waste gas then flows through the activated carbon filter 2 so that the mist of the organic solvent is adsorbed by the activated carbon filter 2. The waste gas now free of the organic solvent is discharged to the outside of the system, i.e., into the atmosphere, through the outlet 1b of the casing 1 by the operation of the fan 3.

The activated carbon filter 2 adsorbs the organic solvent to its full capacity, so that it can be used for a considerably long time. However, since the capacity of the activated carbon filter 2 is limited, adsorption power progressively decreases and, hence, renewal or regeneration of the filter becomes necessary when the amount of the solvent trapped by the filter has materially reached full capacity.

Thus, the known method of treating an organic solvent waste gas requires the renewal or regeneration of the activated carbon filter 2 when its adsorption power has been reduced. The renewal of the activated carbon filter 2 is laborious and requires the whole system to be stopped during the renewal operation, resulting in reduced efficiency in treating the waste gas. On the other hand, the renewal of this type of filter 2 is generally conducted by steaming the filter 2 so as to allow the organic solvent on the filter 2 to be released into the steam, and then discharging the steam containing the solvent to the outside of the system. Obviously, discharge of the steam containing an organic solvent directly to the atmosphere causes air pollution. Thus, the regeneration of the activated carbon filter 2 essentially requires a suitable treatment of the steam containing the organic solvent.

SUMMARY OF THE INVENTION

Accordingly, an object of the present invention is to provide a method and apparatus for treating organic waste gas which do not require discharge of organic solvent to the outside of the system during operation and maintenance of the system, and which do not require the renewal and regeneration of the organic solvent adsorption means and, hence, do not require suspension of operation of the system, so as to ensure a high efficiency of operation of the apparatus, thereby overcoming the above-described problems of the prior art.

To this end, according to one aspect of the present invention, there is provided a method of treating an organic waste gas containing an organic phase such as an organic solvent, comprising: a first step of primarily oxidizing the waste gas by means of a first oxidizing means; and a second step of secondarily almost completely oxidatively decomposing, by means of a second oxidizing means, the organic waste gas primarily oxidized by the first oxidizing means.

According to another aspect of the present invention, there is provided a method of treating an organic waste gas containing an organic phase such as an organic solvent by bringing the organic waste gas into gas-liquid contact with an oxidizing solvent so as to change the organic waste gas into an inorganic solution which is to be discharged to the outside of the system, comprising: a first step of bringing the organic waste gas into gas-liquid contact with the oxidizing solvent thereby to cause the organic waste gas to be dissolved in the oxidizing solvent; and a second step of allowing the mixture of the oxidizing solvent and the organic waste gas dissolved therein to stay in a reservoir and irradiating the mixture in the reservoir with ultraviolet rays thereby promoting the oxidative decomposition of the organic waste gas by the oxidizing solvent.

According to still another aspect of the present invention, there is provided an apparatus for treating an organic waste gas containing an organic phase such as an organic solvent, comprising: a first oxidizing means for primarily oxidizing the organic waste gas; and a second oxidizing means for promoting the oxidation of the organic waste gas oxidized by the first oxidizing means, thereby secondarily and almost completely oxidatively decomposing the organic waste gas.

According to a further aspect of the present invention, there is provided an apparatus for treating organic waste gas comprising: a casing having an inlet for introducing an organic waste gas and an outlet for discharging a treated gas; a fan disposed in the casing in the vicinity of the outlet and adapted to suck the organic waste gas into the casing through the inlet and to force out the treated gas to the outside of the system through the outlet; a first oxidizing means disposed within the casing between the inlet and the outlet and adapted for primarily oxidizing the organic waste gas sucked into the casing through the inlet; and a second oxidizing means disposed in the casing between the first oxidizing means and the outlet and adapted for secondarily and almost completely oxidatively decomposing the organic waste gas which has been oxidized by the first oxidizing means.

According to a still further aspect of the present invention, there is provided an apparatus for treating an organic waste gas containing an organic phase such as an organic solvent, by bringing the organic waste gas into gas-liquid contact with an oxidizing solvent so as to oxidize the organic waste gas and to change the same into an inorganic solution which is to be discharged to the outside of the system, the apparatus comprising: a gas-liquid contact means for bringing the organic waste gas into gas-liquid contact with the oxidizing solvent thereby causing the organic waste gas into the oxidizing solvent thereby to form a mixture; a reservoir for allowing the mixture to stay therein; and an oxidation promotion means for irradiating the mixture in the reservoir with ultraviolet rays so as to promote the oxidation of the organic waste gas by the oxidizing solvent.

According to the invention, the organic solvent waste gas is primarily oxidized by the first oxidizing means and then secondarily oxidatively decomposed almost completely by the second oxidizing means, so that the organic solvent waste gas is rendered substantially harmless before it is discharged to the atmosphere.

In consequence, laborious work such as the renewal or regeneration of filters, which hitherto has been necessary in the conventional systems employing adsorbent such as an activated carbon filter, is eliminated. This in turn eliminates the necessity for the suspension of operation of the apparatus, so that the treating efficiency is improved appreciably. Furthermore, maintenance is facilitated to reduce the total maintenance cost and undesirable discharge of organic solvent to the atmosphere is completely avoided.

The above and other objects, features and advantages of the present invention will become clear from the following description of the preferred embodiments considered in conjunction with the accompanying drawings.

DESCRIPTION OF THE PREFERRED EMBODIMENTS

Preferred embodiments of the present invention will be described hereunder with reference to the accompanying drawings.

According to an embodiment of the organic waste gas treatment method in accordance with the present invention, an organic waste gas is primarily oxidized by a first oxidizing means and then secondarily oxidatively decomposed almost completely by a second oxidizing means, so that the organic waste gas is rendered substantially harmless before it is discharged to the atmosphere.

Figure 1:
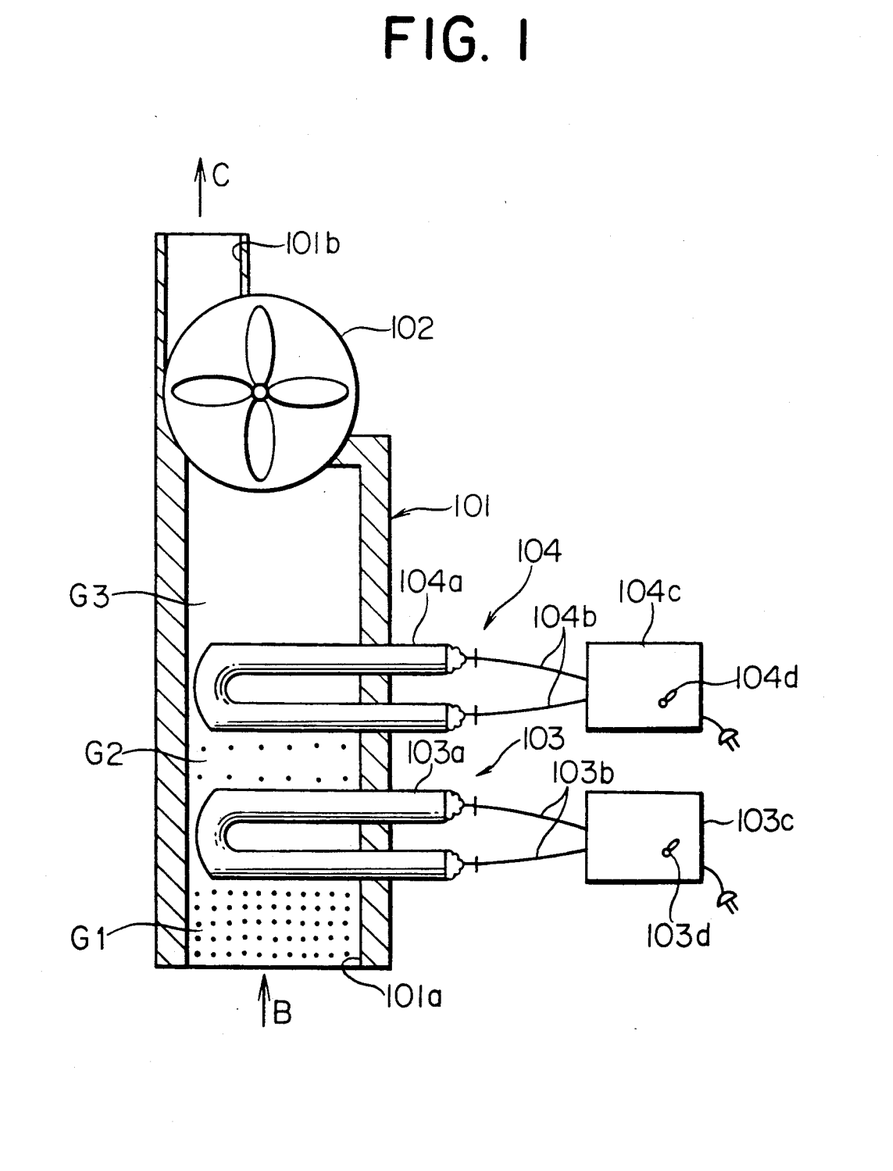
FIG. 1 is a vertical sectional view of a first embodiment of an apparatus for treating organic waste gas in accordance with the present invention.

FIG. 1 illustrates an embodiment of an apparatus of the invention suitable for carrying out the invented method described above.

Referring to FIG. 1, the organic waste gas treatment apparatus has a casing 101 having a waste gas inlet 101a and a waste gas outlet 101b, a fan disposed in the casing 101 in the vicinity of the waste gas outlet 101b and adapted to suck an organic waste gas containing an organic solvent, etc., into the casing through the waste gas inlet 101a and to discharge the same to the outside of the system, i.e., to the atmosphere, through the waste gas outlet 101b, a first oxidizing means 103 mounted in the casing 101 and disposed between the waste gas inlet and outlet 101a, 101b for primarily oxidizing the waste gas sucked into the casing 101, and a second oxidizing means 104 disposed between the first oxidizing means 103 and the waste gas outlet 101b and adapted to almost completely oxidatively decompose the organic solvent waste gas which has been primarily oxidized by the first oxidizing means 103.

The first oxidizing means 103 includes a first ultraviolet ray generating means. In the embodiment shown in FIG. 1, the ultraviolet ray generating means is constituted by a U-tube type ultraviolet lamp 103a having a light-emitting portion disposed in the casing 101 and positive and negative electrodes leading to the outside of the casing 101 so as to be connected, through lead lines 103b, to a power supply 103c. The U-tube type ultraviolet lamp 103a and the power supply 103c are so designed that the lamp 103a emits an ultraviolet ray having a wavelength of 1849Å. The power supply 103c is adapted to be turned on and off by means of a switch 103d. The ultraviolet rays emitted from the ultraviolet ray lamp 103a oxidize the oxygen in the air contained in the organic solvent waste gas introduced into the casing 101, thereby generating ozone. Thus, the ultraviolet ray lamp 103a also serves as an ozone generating means.

The second oxidizing means 104 includes a second ultraviolet ray generating means which is constituted by a U-tube type ultraviolet lamp 104a having a light-emitting portion disposed in the casing 101 and positive and negative electrodes leading to the outside of the casing 101 so as to be connected, through lead lines 104b, to a power supply 104c. The U-tube type ultraviolet lamp 104a and the power supply 104c are so designed that the lamp 104a emits ultraviolet rays having a wavelength of 3650Å.

In operation, the power supplies 103c and 104c are turned on so that electric power is supplied to the first and the second ultraviolet ray lamps 103a and 104a thereby lighting up these lamps. Subsequently, the fan 102 is started to operate so that the waste gas G1 containing air and organic solvent from a gas source (not shown) is sucked into the casing 101 through the inlet 101a as indicated by an arrow B. The oxygen in the air contained in the organic solvent waste gas G1 thus introduced into the casing 101 is irradiated by the ultraviolet rays of 1849Å from the first ultraviolet ray lamp 103a so as to be primarily oxidized into ozone. As is well known, ozone produces a strong oxidizing effect so that the major portion of the organic solvent in the organic waste gas is oxidized by the ozone so as to become a high-molecular peroxide G2.

The high-molecular peroxide G2 is then irradiated by the ultraviolet ray of 3650Å from the second ultraviolet ray lamp 104a, so that it is almost completely oxidatively decomposed into carbon dioxide gas, water and harmless inorganic gaseous components such as nitrogen. At the same time, any art of the organic solvent waste gas, which could not be oxidized by the ultraviolet rays from the first ultraviolet ray lamp 103a and the ozone, can be oxidized and decomposed almost completely by the ultraviolet rays from the second ultraviolet ray lamp 104a. The air G3 which contains the inorganic gases and carbon dioxide, generated as a result of the oxidative decomposition of the organic waste gas, is discharged to the outside of the system, i.e., to the atmosphere, through the outlet 101b by the operation of the fan 102. It will be understood that the air G3 containing inorganic gases and carbon dioxide, and almost free of the organic solvent, does not cause air pollution when emitted to the atmosphere.

In the foregoing description, the decomposition of the organic solvent into inorganic gases has been explained by employing a concept of two distinctive steps. However, it will be clear to those skilled in the art that the oxidation and promotion of oxidation take place everywhere in the apparatus under irradiation by the ultraviolet rays of 1849Å and 3650Å wavelengths. In the embodiment described above, ozone is generated from the oxygen in the air contained in the organic solvent waste gas, by irradiation with ultraviolet rays having a main wavelength of 1849Å generated by the first ultraviolet lamp 103a. This, however, is not exclusive and the invention may incorporate, in place of the first ultraviolet ray lamp 103a, a suitable alternative means such as an ozone generator which generates ozone so as to promote the oxidation of the organic phase.

It is also to be understood that, although the described embodiment employs two separate ultraviolet ray lamps, i.e., first and second lamps, capable of generating ultraviolet rays of 1849Å and 3650Å wavelengths, the same effect can be obtained with a single ultraviolet ray lamp capable of generating two peaks of wavelengths, one at 1894Å and the other at 3650Å.

Furthermore, it is possible to arrange a plurality of pairs of ultraviolet ray lamps, i.e., first and second ultraviolet ray lamps capable of generating ultraviolet rays of both 1849Å and 3650Å, within the casing 101. These pairs of ultraviolet ray lamps are arranged in a plurality of stages, so that the cleaning efficiency can be further enhanced.

Figure 2:
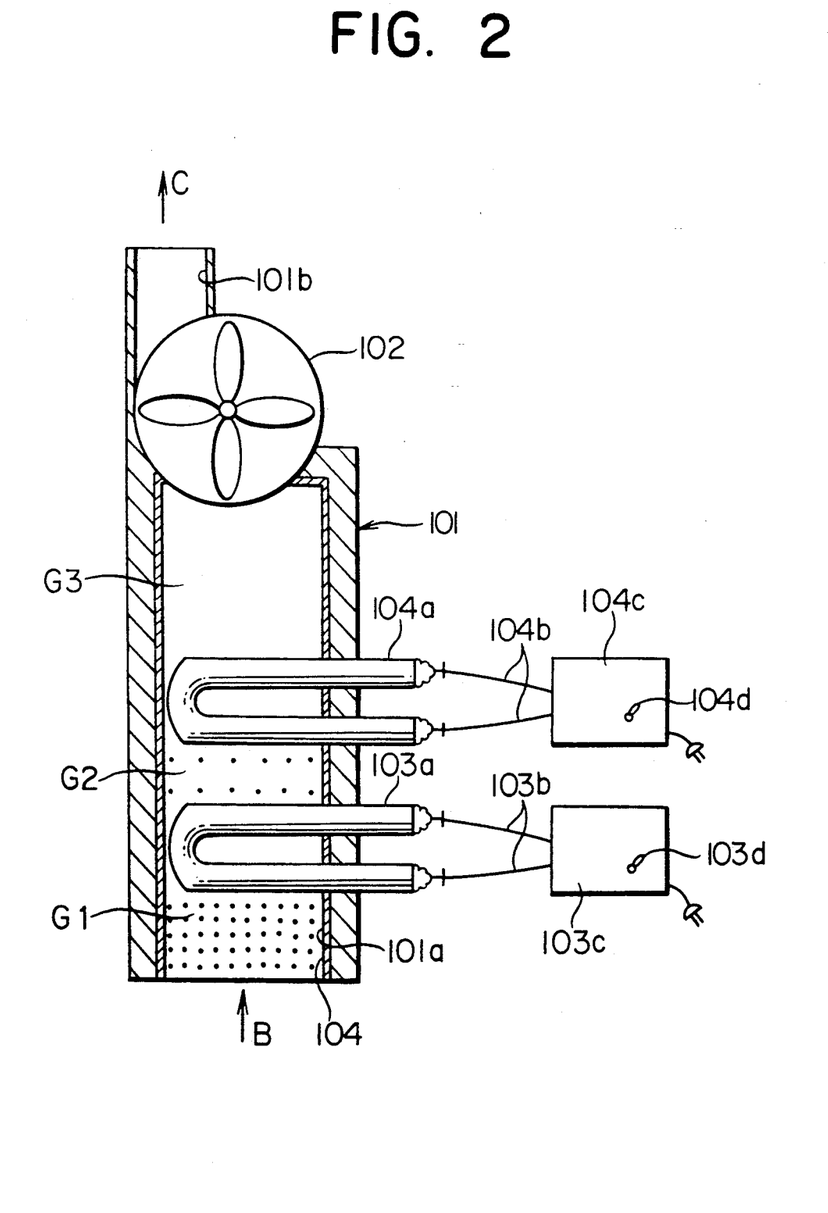
FIG. 2 is a vertical sectional view of a second embodiment of an apparatus for treating organic waste gas in accordance with the present invention.

FIG. 2 shows a second embodiment of organic waste gas treatment apparatus in accordance with the present invention. In this Figure, the same reference numerals are used to denote the same parts or members as those used in the first embodiment of the apparatus. This second embodiment features an ultraviolet reflection layer 104 provided on the inner surfaces of the casing 101. The ultraviolet reflection layer 104 is made of a suitable material capable of reflecting ultraviolet rays, such as silicon, iron, SUS stainless steel, aluminum (with a surface of aluminum oxide) and so forth, and is mirror-finished at its surface and bonded to the inner surfaces of the casing 101 by means of an adhesive.

In this embodiment, the ultraviolet rays emitted from the first and second ultraviolet ray lamps 103a and 104a and impinging upon the inner surfaces of the casing 101 are not absorbed but reflected by the wall surfaces so as to effectively contribute to the oxidation of the organic solvent waste gas, thus improving the cleaning capacity of the apparatus. This means that a greater amount of the organic solvent waste gas can be treated without requiring any increase in the size of the apparatus and without being accompanied by an increase in the consumption of electric power.

Description will be made hereunder as to a second embodiment of the organic waste gas treatment method in accordance with the present invention. In this method, the waste gas containing, for example, an organic solvent is brought into gas-liquid contact with an oxidizing solvent so that it is dissolved in the oxidizing solvent and primarily oxidized. The mixture of the oxidizing solvent and the organic solvent waste gas is stored in the reservoir and is irradiated with ultraviolet rays so that the oxidation of the organic solvent waste gas is promoted. In consequence, the organic solvent waste gas is almost completely oxidatively decomposed to become harmless matter before being discharged into the atmosphere.

Figure 3:
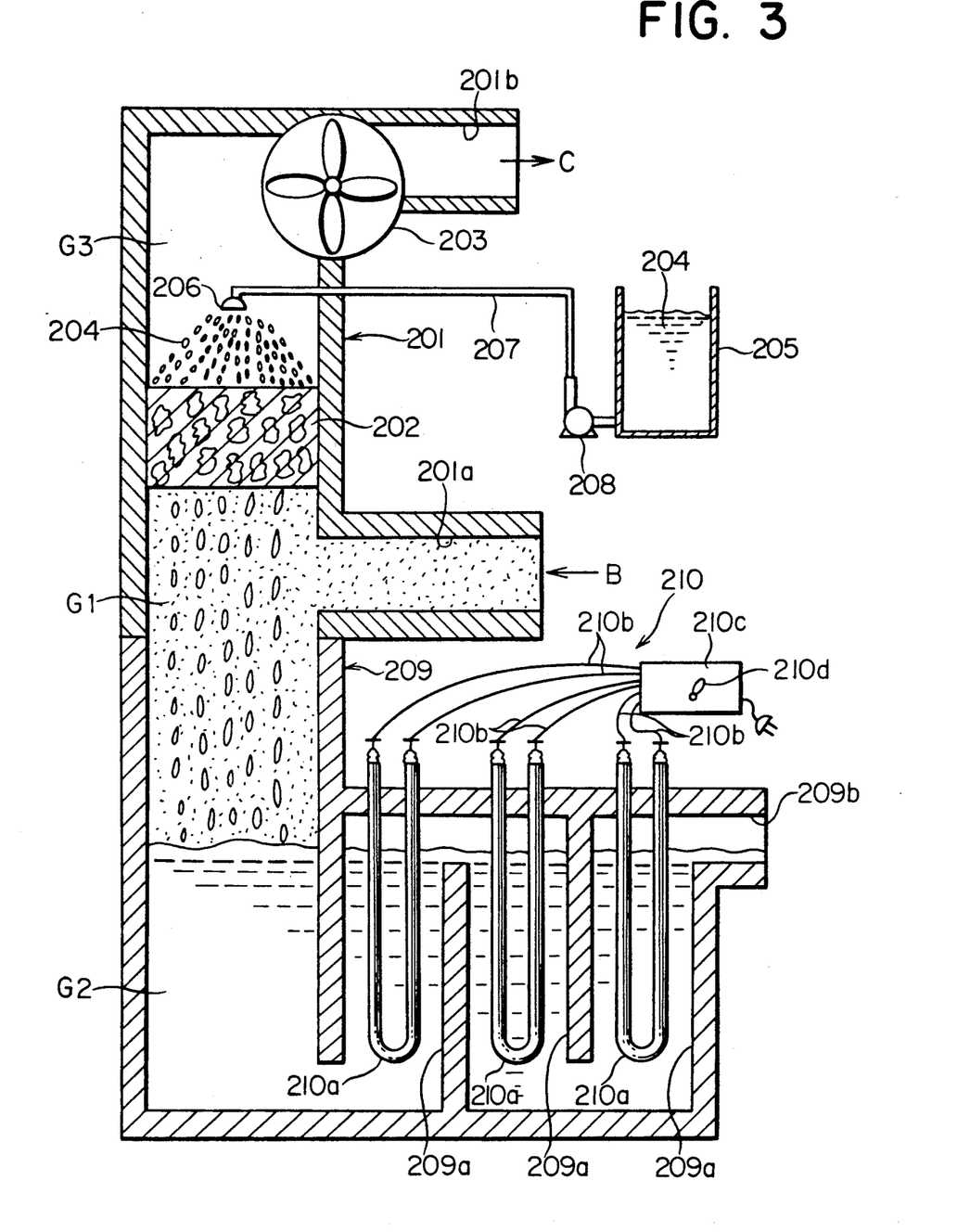
FIG. 3 is a vertical sectional view of a third embodiment of an apparatus for treating organic waste gas in accordance with the present invention.

FIG. 3 shows an apparatus suitable for use in carrying out this method of treatment.

The apparatus of FIG. 3 has a substantially vertical cylindrical casing 201 provided at its lower portion with an inlet 201a extending substantially horizontally from the side wall thereof and an outlet 201b provided at the upper end thereof. The apparatus further has a filler 202 disposed in the casing 201 such as to divide the space in the casing 201 into upper and lower sections, which is adapted to enhance the efficiency of the gas-liquid contact between the waste gas containing the organic solvent and the oxidizing solvent. The apparatus further has a fan 203 disposed in the casing 201 in the vicinity of the outlet 201b, which is adapted to suck the waste gas G1 containing the organic solvent from a source (not shown) into the casing 201 through the inlet 201a and to discharge the treated gas to the outside of the system through the outlet 201b. The apparatus also has a tank 205 containing the oxidizing solvent 204 serving as the first oxidizing means, an oxidizing solvent supply pipe 207 having one end extending through the cylindrical wall of the casing 201 and connected to a spray nozzle 206 downstream of the filler 202, i.e., between the filler 202 and the fan 203, the other end of the oxidizing solvent supply pipe 207 being connected to the lower end of the tank 205, and a pump 208 disposed at an intermediate portion of the oxidizing solvent supply pipe 207 and adapted to deliver the oxidizing solvent 204 from the tank 205 to the spray nozzle 206 through the oxidizing solvent supply pipe 207. Furthermore, the apparatus is provided with a reservoir 209 having an upper end connected to the open lower end of the casing 201 and adapted to receive and store the mixture G2 of the oxidizing solvent and the organic solvent of the waste gas, the mixture being formed as the organic solvent in the waste gas is dissolved in the oxidizing solvent which is sprayed from the spray nozzle 206 and flowing down across the filler 202, and an oxidation-promotion means 210, i.e., second oxidizing means, disposed in the reservoir 209 and adapted to promote the oxidation of the organic solvent by the oxidizing solvent in the mixture staying in the reservoir 209.

In the illustrated embodiment, the oxidation promotion means includes a plurality of ultraviolet ray lamps 210a with their U-shaped light-emitting portions disposed in the reservoir 209 and having their positive and negative electrodes extending to the outside of the reservoir 209 through the upper end of the reservoir 209, a power supply 210c connected to the positive and negative electrodes of the ultraviolet ray lamps 210a through respective lead lines 210b, and a switch 210d for selectively turning the power supply 210c on and off.

The interior of the reservoir 209 is divided into a plurality of sections or small chambers 209a which are communicated with adjacent ones at their upper and lower ends. These small chambers 209a are arrayed in the direction of flow of the organic solvent from the inlet 201b to the outlet 290b of the casing 201, so that the mixture supplied into the reservoir 209 is progressively oxidized as it passes the successive small chambers 209a. Thus, the organic solvent in the mixture is almost completely oxidatively decomposed to become a harmless inorganic solvent when it reaches the last small chamber 209a adjacent to the outlet 209b.

In operation, the switch 210d is turned on so that the electric power is supplied from the power supply 210b to the ultraviolet ray lamps 210a thereby turning these lamps on. Subsequently, the fan 203 is started to operate so that the waste gas G1 containing the organic solvent, coming from the gas source, which is not shown, is sucked into the casing 201 through the inlet 201a as indicated by an arrow B. The waste gas G1 sucked into the casing 201 is forced to flow towards the outlet 201b across the filler 202 due to pressure difference developed across this filler as a result of operation of the fan 203. Meanwhile, the pump 208 pumps the oxidizing solvent 204 from the tank 205 and supplies the same to the spray nozzle 206 through the oxidizing solvent supply pipe 207, so that the oxidizing solvent is sprayed from the spray nozzle 206 onto the filler 202. Thus, the filler 202 is sufficiently impregnated with the oxidizing solvent 204 that a good gas-liquid contact takes place between the waste gas flowing through the filler 202 and the oxidizing solvent 204 with which the filler 202 is impregnated. As a consequence, the organic solvent waste gas is effectively dissolved in the oxidizing solvent 204. Various solvents can be used satisfactorily as the oxidizing solvent, such as a mixture of hydrogen peroxide and water, a mixture of sulfuric acid and water, a mixture of sulfuric acid, hydrogen peroxide and water, a mixture of sulfuric acid, nitric acid and water, a mixture of sulfuric acid, ozone dissolved in water and water, a mixture of nitric acid and water, a mixture of hydrochloric acid and water, and so forth. Other types of oxidizing solvent can be used provided that they can render the organic solvent harmless through oxidation.

The mixture G2 of the oxidizing solvent and the organic solvent waste gas dissolved therein drops in the form of droplets from the filler 202 and is collected in the reservoir 209. Meanwhile, the cleaned waste gas, i.e., air G3, now free of the organic solvent gas, is discharged to the outside of the system, i.e., into the atmosphere, past the outlet 201b of the casing 201 as indicated by an arrow C. The mixture G2 of the oxidizing solvent and the organic solvent waste gas then flows into the oxidation promotion region constituted by the successive small chambers 209a each receiving one of the ultraviolet ray lamps 210a. Therefore, the oxidative decomposition of the organic solvent in the mixture G2 flowing into the reservoir 209 is promoted as the mixture G2 flows through the successive small chambers 209a and is finally changed into harmless inorganic solvent before it is discharged to the outside of the system.

The oxidative decomposition of the organic solvent waste gas commences when the waste gas is brought into contact with the oxidizing solvent 204. In general, however, the oxidative decomposition proceeds only to the generation of high-molecular peroxides and cannot be completed particularly when hydrogen peroxide or a similar oxidizing solvent is used. In this embodiment, however, the oxidative decomposition is promoted by virtue of the oxidation promotion effect of the ultraviolet rays having a wavelength preferably ranging between 2,000 and 4,000Å, with which the mixture G2 under the treatment in the reservoir 209 is irradiated, so that the organic solvent waste gas can be completely decomposed into carbon dioxide gas, water and harmless inorganic gases.

Figure 4:
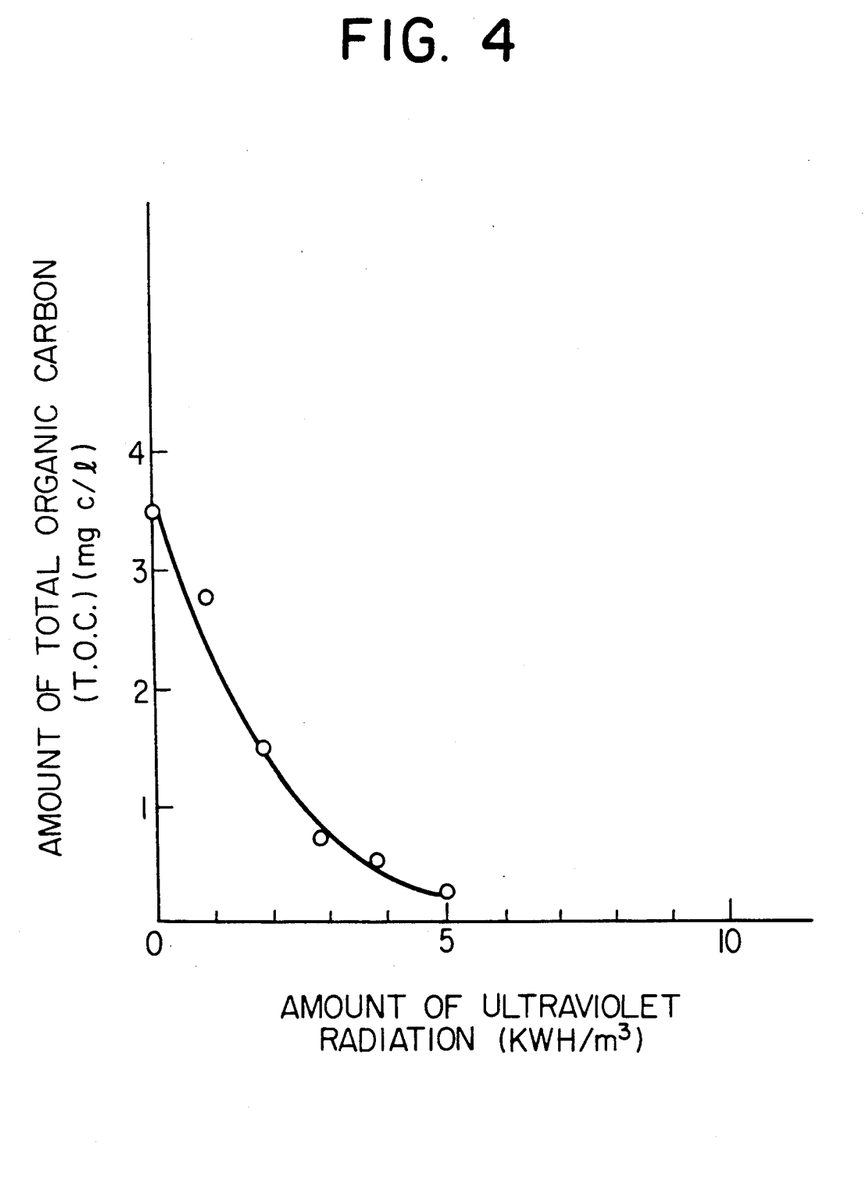
FIG. 4 is a graph showing the result of a test for oxidatively decomposing isopropyl alcohol in accordance with a method of the present invention, by treating the same with hydrogen peroxide followed by irradiation with ultraviolet rays.

FIG. 4 shows, by way of example, the result of a test in which isopropyl alcohol as an example of the organic solvent was treated by hydrogen peroxide followed by irradiation with the ultraviolet rays. More specifically, in this test, 55 l of a test solution containing isopropyl alcohol was treated with 100 ppm of hydrogen peroxide, with the aid of a low-pressure ultraviolet ray lamp of 210W.

In this graph, the ordinate represents the total amount of organic carbon (TOC)(mgC/l) while the abscissa represents the rate of irradiation with the ultraviolet rays (KWH/m$^3$). As will be seen from this Figure, the total organic carbon in the test solution remarkably decreases in accordance with an increase in the rate of irradiation with the ultraviolet rays and is reduced almost to zero when the irradiation rate is about 5 KWH/m$^3$.

Although the invention has been described through its preferred forms, it is to be understood that the described embodiments are only illustrative and various changes and modifications may be imparted thereto without departing from the scope of the invention which is limited solely by the appended claims.

What is claimed is:

1. An apparatus for treating an organic waste gas containing an organic phase comprising:

oxidizing means for carrying out primary oxidation of the organic waste gas by contacting the waste gas with a chemical oxidizing agent to generate a primary oxidation product; and a first ultraviolet ray generator for irradiating the primary oxidation product with ultraviolet rays having a wavelength which promotes the secondary oxidation of the primary oxidation product.

2. An apparatus according to claim 1, wherein said oxidizing means comprises a second ultraviolet ray generator operating at a frequency to generate ozone from oxygen contained in the waste gas.

3. An apparatus according to claim 2, wherein said second ultraviolet ray generator produces ultraviolet rays having a wavelength of 1849Å.

4. An apparatus according to claim 1, wherein said oxidizing means comprises an ozone generator.

5. An apparatus according to claim 1, wherein said oxidizing means comprises a gas-liquid contact means for contacting said organic waste gas with a liquid oxidizing solvent to dissolve said organic waste gas in said oxidizing solvent.

6. An apparatus according to claim 1, wherein said first ultraviolet ray generator produces ultraviolet rays of a wavelength ranging between 2,000 and 4,000Å.

7. An apparatus according to claim 6, wherein said first ultraviolet ray generator produces ultraviolet rays having a wavelength of 3650Å.

8. An apparatus for treating an organic waste gas comprising:

a casing having an inlet for introducing an organic waste gas and an outlet for discharging a treated gas;

a fan disposed in said casing for drawing said organic waste gas into said casing through said inlet and discharging the treated gas from said outlet;

oxidizing means for carrying out primary oxidation of the organic waste gas by contacting said organic waste gas in said casing with a chemical oxidizing agent to generate a primary oxidation product; and an ultraviolet ray generator disposed in said casing between said oxidizing means and said outlet for irradiating the primary oxidation product with ultraviolet rays having a wavelength which promotes secondary oxidation of the primary oxidation product.

9. An apparatus according to claim 8, wherein said oxidizing means comprises a second ultraviolet ray generator operating at a frequency to generate ozone from oxygen contained in the waste gas.

10. An apparatus according to claim 9, wherein said second ultraviolet ray generator produces ultraviolet rays having a wavelength of 1849Å.

11. An apparatus according to claim 9, wherein the inner surfaces of said casing are covered with an ultraviolet ray reflecting layer.

12. An apparatus according to claim 11, wherein said ultraviolet ray reflecting layer is made of a material selected from the group consisting of silicon, iron, SUS, stainless steel and aluminum.

13. An apparatus according to claim 8, wherein said oxidizing means comprises an ozone generator.

14. An apparatus according to claim 8, wherein said ultraviolet ray generator produces ultraviolet rays having a wavelength of 3650Å.

15. An apparatus for treating an organic waste gas containing an organic phase such as an organic solvent comprising:

a gas-liquid contact means for contacting an organic waste gas with an oxidizing solvent capable of effecting primary oxidation of the organic waste gas to form a mixture containing a primary oxidation product of the waste gas;

a reservoir for holding the resulting mixture; and an ultraviolet ray generator for irradiating the mixture in said reservoir with ultraviolet rays having a wavelength which promotes secondary oxidation of the primary oxidation product.

16. An apparatus according to claim 15, wherein said gas-liquid contact means comprises:

a casing having an inlet for introducing the organic waste gas and an outlet for discharging treated gas;

a filler disposed in said casing between said inlet and said outlet;

a sprayer for spraying the oxidizing solvent onto said filler to impregnate said filler with said oxidizing solvent; and a flow generating means for causing said organic waste gas to flow through said filler.

17. An apparatus according to claim 16, wherein said sprayer comprises a tank containing the oxidizing solvent, a spray nozzle disposed in said casing opposite said filler, and a pump which connects the spray nozzle and the tank.

18. An apparatus according to claim 16, wherein said flow generating means comprises a fan disposed in said casing in the vicinity of said outlet.

19. An apparatus according to claim 15, wherein the interior of said reservoir is divided into a plurality of small chambers in communication with adjacent chambers, each of said small chambers being provided with at least one ultraviolet ray generator.

20. An apparatus according to claim 19, wherein said reservoir has an inlet end and an outlet, and said small chambers are arranged in the direction of flow of said mixture from said inlet end towards the outlet successively in such a manner that the successive small chambers communicate at their upper and lower ends alternatingly.

21. An apparatus according to claim 19, wherein said ultraviolet ray lamp generates ultraviolet rays of a wavelength ranging between 2,000 and 4,000Å.

22. An apparatus for treating an organic waste gas containing an organic phase comprising:

a chamber for holding an organic waste gas;

a first ultraviolet ray generator for irradiating the inorganic waste gas in the chamber, the first ultraviolet ray generator producing ultraviolet rays of a first wavelength suitable for generating ozone from oxygen in the waste gas; and a second ultraviolet ray generator for irradiating the inside of the chamber with ultraviolet rays of a second wavelength which differs from the first wavelength and which can effect secondary oxidation of a primary oxidation product formed by oxidation of the waste gas by ozone formed in the chamber.

23. An apparatus as claimed in claim 22, wherein the second wavelength is in the range of 3650 to 4000Å.

24. An apparatus for treating an organic waste gas containing an organic phase comprising:

oxidizing means for contacting a waste gas with ozone to form a primary oxidation product; and an ultraviolet ray generator for irradiating the primary oxidation product with ultraviolet rays having a wavelength which promotes the secondary oxidation of the primary oxidation product.

25. An apparatus as claimed in claim 24, wherein the wavelength is in the range of 3650 to 4000Å.

* * * * *